(12) United States Patent
Wang et al.

(10) Patent No.: US 11,774,296 B2
(45) Date of Patent: Oct. 3, 2023

(54) METHOD AND CIRCUIT FOR SENSING MOSFET TEMPERATURE FOR LOAD SWITCH APPLICATION (71) Applicant: Alpha and Omega Semiconductor International LP, Toronto (CA)

(72) Inventors: Zhenyu Wang, Santa Clara, CA (US); Jian Yin, San Ramon, CA (US); Lingpeng Guan, San Jose, CA (US); Sitthipong Angkititrakul, Dublin, CA (US); Christopher Ben Bartholomeusz, Draper, UT (US); Xiaobin Wang, San Jose, CA (US)

(73) Assignee: ALPHA AND OMEGA SEMICONDUCTOR INTERNATIONAL LP, Toronto (CA)

( * ) Notice: Subject to any disclaimer, the term of this patent is extended or adjusted under 35 U.S.C. 154(b) by 97 days.

(21) Appl. No.: 17/524,566

(22) Filed: Nov. 11, 2021

(65) Prior Publication Data

US 2023/0147081 A1 May 11, 2023

(51) Int. Cl.
| G01K 7/01 | (2006.01) |
| H02H 5/04 | (2006.01) |
| G01K 7/22 | (2006.01) |
| G01K 7/28 | (2006.01) |
| H02H 9/00 | (2006.01) |
| H02H 9/02 | (2006.01) |
| H02H 9/04 | (2006.01) |

(52) U.S. Cl.
CPC .............. *G01K 7/01* (2013.01); *G01K 7/22* (2013.01); *G01K 7/28* (2013.01); *H02H 9/00* (2013.01); *H02H 9/02* (2013.01); *H02H 9/04* (2013.01)

(58) Field of Classification Search
CPC .. G01K 7/01; G01K 7/22; G01K 7/28; H02H 9/00; H02H 9/02; H02H 9/04; H02H 5/04; H02H 5/042; H02H 5/044
See application file for complete search history.

(56) References Cited

U.S. PATENT DOCUMENTS

| 6,137,165 | A | 10/2000 | Thierry | |
| 6,948,847 | B2 | 9/2005 | Pihet et al. | |
| 2004/0042142 | A1* | 3/2004 | Ikeda | H02H 5/042 |
| | | | | 361/103 |
| 2004/0222430 | A1 | 11/2004 | Necco et al. | |
| 2005/0264971 | A1* | 12/2005 | Morino | G01K 3/005 |
| | | | | 361/103 |
| 2007/0210893 | A1* | 9/2007 | Hasunuma | H01M 10/42 |
| | | | | 429/62 |
| 2011/0194223 | A1* | 8/2011 | Kang | H02H 5/042 |
| | | | | 361/106 |
| 2016/0301224 | A1* | 10/2016 | Kim | H01M 10/443 |
| 2017/0338646 | A1* | 11/2017 | Djelassi | H02H 5/041 |

(Continued)

*Primary Examiner* — Scott Bauer
(74) *Attorney, Agent, or Firm* — JDI PATENT; Joshua D. Isenberg; Robert Pullman (57) ABSTRACT

A method and device for temperature monitoring of a power transistor formed in a semiconductor die comprising are disclosed. A side of a temperature-sensing resistor disposed in the semiconductor die is coupled to a voltage input side of the power transistor. A controller coupled to a second side of the temperature-sensing resistor is configured to detect a voltage across the resistor and trigger a temperature related corrective action using the detected voltage.

16 Claims, 7 Drawing Sheets

(56) References Cited

U.S. PATENT DOCUMENTS

2018/0013266 A1* 1/2018 Iwamoto ................ H02H 5/044
2018/0366970 A1* 12/2018 Zhou ....................... H02M 1/08
2021/0152131 A1* 5/2021 Benson ................... H03F 3/245

* cited by examiner

METHOD AND CIRCUIT FOR SENSING MOSFET TEMPERATURE FOR LOAD SWITCH APPLICATION

FIELD OF THE INVENTION

Aspects of the present disclosure are related to temperature monitoring of semiconductor devices, specifically aspects of the present disclosure relate to temperature-sensing of transistor devices.

BACKGROUND OF THE INVENTION

In power device applications using a semiconductor transistor, soft start of the power device may cause a large difference between the input voltage and output voltage of the power transistor. Switching with a large voltage difference across the power transistor may result in the transistor heating up and without proper management may lead to the thermal destruction of the semiconductor transistor. Thus, temperature monitoring of the power transistor is needed to ensure that the semiconductor transistor is not destroyed by overheating.

Prior attempts at power transistor temperature monitoring have used temperature resistors or diode networks placed physically near a semiconductor power transistor but not on the semiconductor die itself. These temperature sensors were inaccurate due the poor thermal conduction between the temperature sensor and the power transistor package. Some thermal sensors use diodes networks formed on the semiconductor die of the transistor as this provides better thermal conduction. Diode network temperature sensors provide additional difficulties for temperature sensing because the voltage drop across diodes is non-linear with respect to temperature. Additionally a network of diodes linked in series increases errors in temperature detection as each diode in the network increases the detection error due to variability in diode manufacture.

A temperature-sensing resistor formed in the semiconductor die connected to the gate contact of the semiconductor transistor has been tried in U.S. Pat. No. 6,948,847 to Pihet et al. but is not suitable for many applications. Specifically, temperature-sensing resistors connected to the gate input of the semiconductor transistor are not suitable for load switching applications having a gate signal with a high dynamic range in the voltage and frequency as the gate voltage may be in constant and unpredictable flux due to the nature of the switching. Thus, there is a need in the art for an accurate way to determine the temperature of the semiconductor transistor in high frequency switching applications.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

In the interest of clarity, not all of the routine features of the implementations described herein are shown and described. It will be understood by those skilled in the art that in the development of any such implementations, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of the present disclosure.

Figure 1:
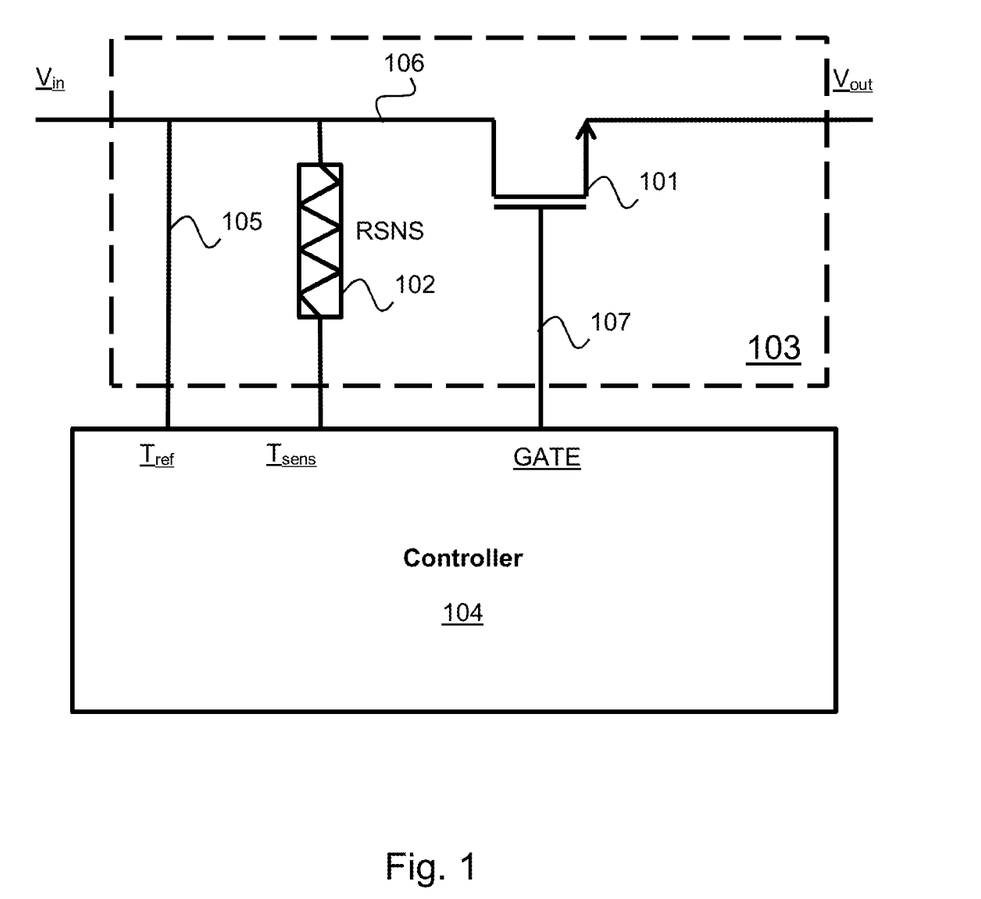
FIG. 1 is a simplified schematic circuit diagram of a device for temperature-sensing of a semiconductor transistor according to an aspect of the present disclosure.

FIG. 1 depicts a simplified schematic circuit diagram of a device for temperature sensing of a semiconductor transistor according to an aspect of the present disclosure. As shown a power transistor 101 is formed in a semiconductor die 103. The temperature-sensing device includes a temperature-sensing resistor 102 formed in the same semiconductor die 103 as the transistor 101 and conductively coupled to a voltage input side 106 of the transistor 101. A controller 104 is conductively coupled to the other side of the temperature-sensing resistor 102. The controller 104 is also conductively coupled in parallel with the temperature-sensing resistor 102 to the input side of the transistor 106 through a conductive connection 105.

It should be understood that the voltage input side of the power transistor refers to the circuitry on the side of the transistor that receives voltage at the transistor and the transistor acts to block current from that side in the off condition and allows current flow through the voltage input to the voltage output side in on state. In an NPN type transistor the circuitry connected to the drain of the transistor would be on the voltage input side and in the PNP type transistor, circuitry connected to the source would be on the voltage input side. Aspects of the present disclosure contemplate implementations with either NPN type or PNP type transistors. Additionally implementations of the current disclosure are not limited to Field Effect Transistor (FET) type transistors such as Metal Oxide Semiconductor FET (MOSFET), or Junction FET (JFET) and may be applied to other transistors such as Insulated Gate Bipolar Transistors (IGBT) or a Bipolar Junction Transistor (BJT).

Here, a side of the temperature-sensing resistor 102 receives current directly from the voltage input to the power transistor 101. As discussed above, in high frequency application the gate voltage may fluctuate due to the frequency of switching. On the other hand, the voltage input to the transistor may be very steady. Generally, voltage at the voltage input side of the transistor only fluctuates during start up. In the worst-case scenario, for this implementation, the voltage may vary by only around 20%. This makes the voltage input side a good source of voltage for a temperature-sensing resistor.

The controller 104 is coupled to the side of the temperature-sensing resistor 102 opposite the connection to the voltage input of the transistor and is configured to detect a voltage across the temperature-sensing resistor 102. The controller 104 may also be conductively coupled to the gate of the transistor 101 to enable temperature related corrective actions at the transistor 102. The controller 104 may be configured to trigger a temperature related corrective action using the voltage across temperature-sensing resistor. Here, it should be understood that the resistance of the temperature-sensing resistor is dependent upon the local temperature around the resistor 102 because the resistor 102 is located close to the transistor 101 on the same semiconductor die. The temperature-sensing resistor 102 is thermally coupled to the power transistor 101. Thus, changes in resistance of the temperature sensitive resistor may be correlated to changes in the temperature of the transistor 101. For example and without limitation the controller 104 may be configured to trigger the temperature related corrective action when the voltage across the temperature-sensing resistor meets a threshold. In some implementation, the resistor may have a negative temperature coefficient thus when the voltage across the temperature-sensing resistor 102 falls below a threshold the controller is configured to enact one or more temperature related corrective actions. Alternatively, the resistor may have a positive temperature coefficient and in that case, when the voltage across the temperature-sensing resistor 102 rises above the threshold the controller is configured to enact temperature one or more related corrective actions. In either case when the voltage meets a threshold, one or more temperature related correction actions may be taken by the controller. In some implementations the controller 104 may be configured to strongly correlate the voltage across the temperature-sensing resistor with the temperature of the transistor, in this case the controller may enact more complex temperature related corrective actions based for example on several different thresholds, a derivative of the voltage change or other complex temperature related calculations.

A Temperature related corrective action may be any action implemented by the controller configured to reduce the temperature of the transistor. For example and without limitation, a temperature related corrective action may be turning off the transistor, or lowering the current across the transistor, or changing the switching frequency of the transistor. Each of these temperature related corrective actions involve changing the voltage to the gate, other temperature related corrective actions may also be possible for example triggering a over temperature warning such as a buzzer or a displayed message or triggering another switch to reduce the current to transistor. The other switch may be on a different semiconductor die to ensure that heat is not transferred to the transistor.

The controller 104 may be located on a second semiconductor die separate from semiconductor die 103 having the transistor 101 and the temperature-sensing resistor 102. Alternatively, the controller 104 may be located on the same die 103 as the power transistor 101 and the temperature-sensing resistor 102. In yet another implementation, the controller 104 may be located on the opposite side of the same die 103 as the transistor 101 and the temperature-sensing resistor 102. Bond wires may conductively couple the controller 104 to the temperature sensitive resistor 102 and the voltage input side of the transistor. Additionally bond wires may conductively couple the controller to the gate of the transistor 107.

Figure 2:
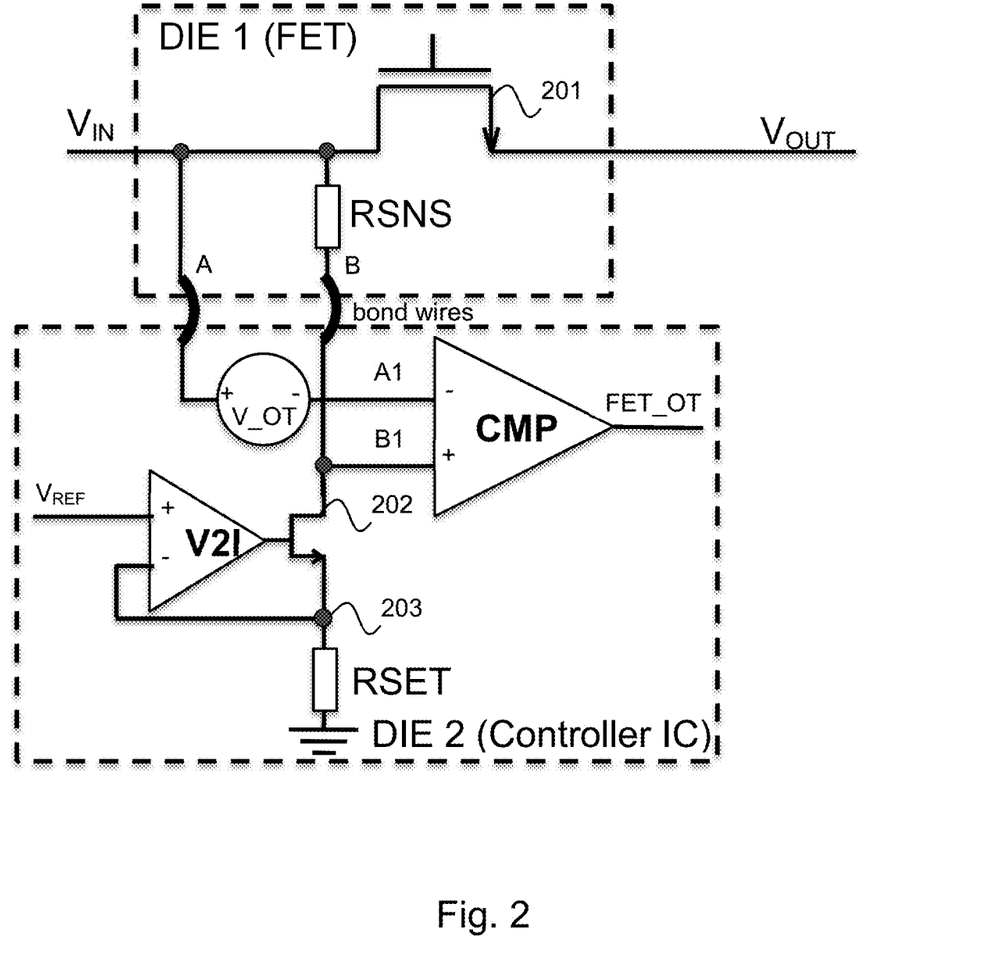
FIG. 2 is a detailed schematic circuit diagram of an implementation of the device for power transistor temperature-sensing according to an aspect of the present disclosure.

FIG. 2 shows a detailed schematic circuit diagram of an implementation of the device for temperature sensing according to an aspect of the present disclosure. Specifically the temperature sensing circuit of the controller is shown in detail. In this implementation, the output of a first comparator CMP acts as a trigger for one or more temperature related corrective actions. As shown, an input A1 of the comparator receives an output voltage from a parallel coupling connected to the input of the power transistor 201. The parallel coupling in this example is a constant voltage source V_OT connected in parallel with the temperature-sensing resistor RSNS. The controller uses an output of the constant voltage source V_OT as an input to the comparator CMP. The voltage across the temperature-sensing resistor RSNS is delivered to the first comparator CMP at input B1. The current through the temperature-sensing resistor RSNS flows through a gating transistor 202 and resistor RSET to ground. An output of a second amplifier V2I controls a control element (e.g., gate or base) of the gating transistor 202 one input of the second comparator is connected to a reference voltage $V_{REF}$ and a second input is coupled to a node 203 between the gating transistor 202 and the resistor RSET in a feedback loop.

At normal operating temperatures, the amplifier V2I, the gating transistor 202, and the resistor RSET sets a current to bias the temperature-sensing resistor RSNS. An increase in temperature at the temperature-sensing resistor RSNS causes a change in the resistance of the temperature sensing resistor and the changes the voltage drop across the temperature-sensing resistor RSNS and also the voltage a the first comparator input B1. When the voltage across the temperature-sensing resistor RSNS crosses threshold voltage V_OT, the first comparator CMP toggles its output FET_OT. The change in the output triggers a temperature-related corrective action that regulates current through the power transistor 201. Such corrective action may include, e.g., changing the voltage applied to the gate of the power transistor 201 to turn it off or by sequentially turning the gate of the power transistor 201 on and off to modulate the current through the power transistor. Alternatively, the corrective action may include changing the voltage applied to the gate of the power transistor 201 to reduce the current through the power transistor without turning it off completely.

It should be noted that the polarity of the input terminals of the comparator CMP may be switched depending on the type of temperature-sense resistor RSNS. For example and without limitation if the resistor RSNS has a positive temperature coefficient then the negative terminal of comparator CMP may be connected to B1 and the positive terminal may be connected to A1. Likewise if the resistor RSNS is a negative temperature coefficient resistor the positive terminal of comparator CMP may be connected to B1 and the negative terminal connected to A1. The output of the comparator FET_OT may be used as an over temperature trigger to implement one or more temperature related corrective actions. The tripping point of the first comparator CMP may be manipulated by changing the resistance of Rset or the Voltage Vref, and the threshold voltage V_OT is defined by the equation V_OT=(Vref/Rset)*RSNS.

As discussed above a benefit of conductively coupling the temperature-sense resistor to the voltage input side of the transistor is that the voltage received at the temperature-sensing resistor RSNS is generally very steady with low variation, e.g., about 20% variation in voltage. A low pass filter (not shown) may be placed between the connection of the temperature-sensing resistor RSNS and the voltage input Vin to filter out any transient voltage spikes. Alternatively, a low pass filter may be connected to the output of the comparator to filter out transient voltage spikes. In some implementations voltage spike occur during device startup and in those implementations a blanking period may be added to the comparator output such that events that lasting for example and without limitation, less than 200 microseconds or less than 300 microsecond are ignored by the comparator.

Figure 3:
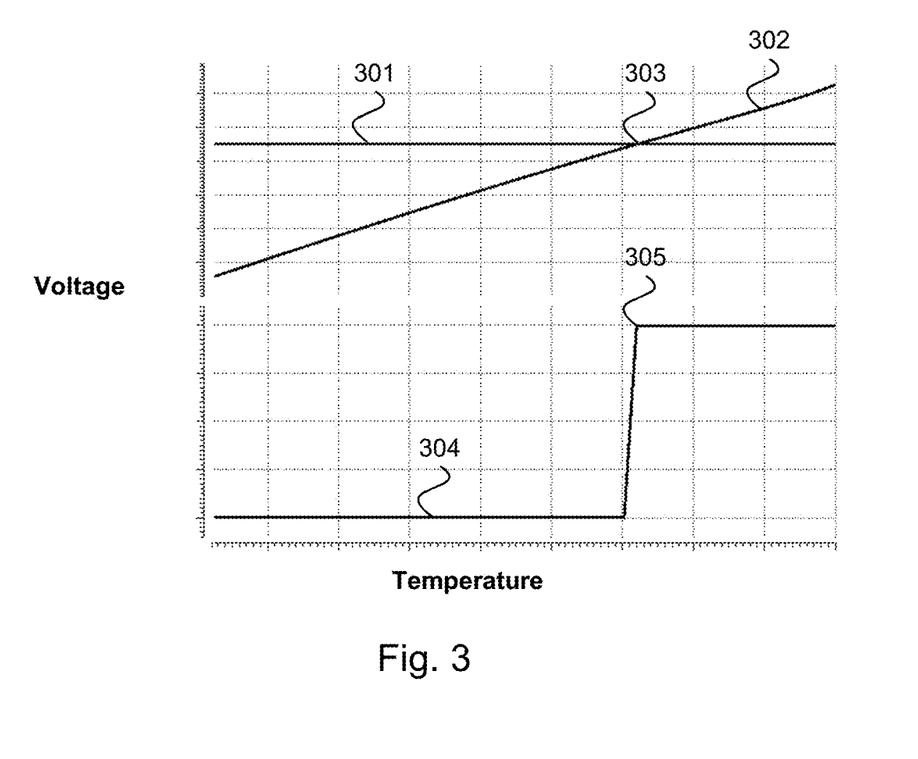
FIG. 3 is a couplet of graphs showing the response of the circuit in FIG. 2 to a change in temperature of a power transistor according to aspects of the present disclosure.

FIG. 3 is a couplet of graphs showing the response of the circuit in FIG. 2 to a change in temperature of the semiconductor transistor according to aspects of the present disclosure. As shown the voltage at B1 shows a linear temperature dependence, indicated at 302. Meanwhile the voltage from the parallel leg at A1 is constant, as indicated at 301. The comparator output OT_FET is low or 0, as indicated at 304 when the voltage at B1, is below the constant threshold voltage at A1. When the voltage at B1, meets the threshold voltage at A1, as indicated at 304, the output of CMP is pulled high, as indicated at 305. Thus, the output OT_FET may be used as triggering signal for one or more temperature related corrective actions.

Figure 4:
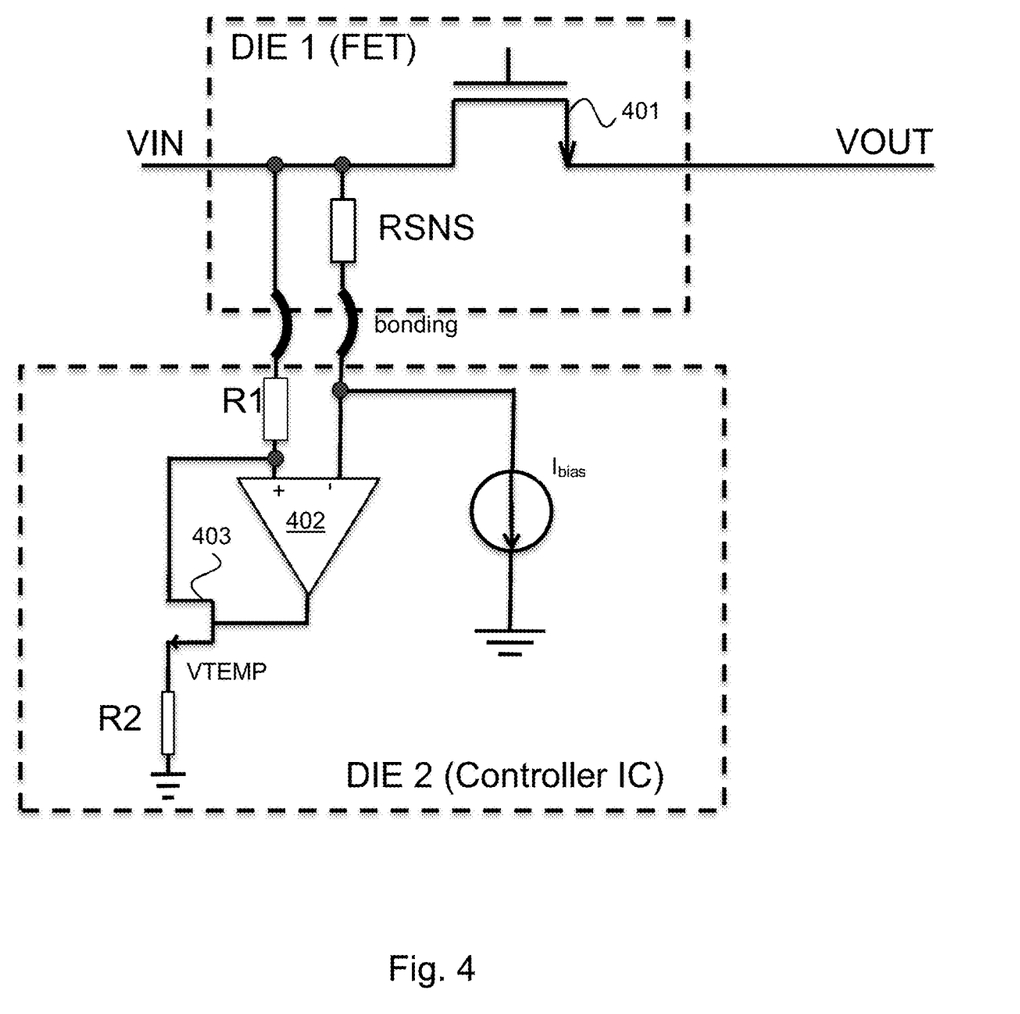
FIG. 4 is a detailed schematic circuit diagram of another implementation of the device for power transistor temperature-sensing according to an aspect of the present disclosure.

FIG. 4 is a detailed schematic circuit diagram of another implementation of the device for temperature sensing according to an aspect of the present disclosure. In this implementation the amplifier 402 amplifies the voltage change across the resistor RSNS using a first voltage divider resistor R1 between VIN and a first input to the amplifier 402, a transistor 403 coupled between the first input to the comparator and a second voltage divider resistor R2 coupled between the transistor 403 and ground. An output of the comparator is coupled to the base of the transistor 403. The constant current draw Ibias biases the temperature-sensing resistor RSNS drawing a constant current to the amplifier. The amplifier 402 compares the voltage across the temperature sensitive resistor RSNS to the voltage from the parallel connection to the Voltage input side of the transistor delivering the result to the base of the transistor 403. In this implementation voltage at VTEMP across the transistor 403 is controlled by the output of amplifier 402. As the temperature of the power transistor 401 increases, the heat causes the resistance of the temperature sensitive resistor RSNS to increase or decrease depending on the nature of the temperature sensitive resistor. The increase or decrease in resistance results in a corresponding increased or decreased voltage drop across the resistor RSNS. The resulting difference in voltage at the inputs to the amplifier 402 causes a change in the comparator output. This in turn causes a change in voltage supplied to the base of the transistor 403 resulting in a change in voltage at VTEMP.

The circuit shown in FIG. 4 generally replicates and amplifies the voltage across the temperature-sensing resistor RSNS by the ratio of the voltage divider resistances R2/R1. This amplified voltage may then be compared to a reference voltage and a result of the comparison may trigger one or more temperature related corrective actions. By way of example, the circuit shown in FIG. 4 may be generally configured so that as the temperature of the temperature-sensing resistor RSNS increases the resulting change in output of the comparator 402 causes the transistor 403 to shunt current through the voltage divider resistors R1, R2 thereby reducing the current through the power transistor 401.

To simplify manufacturing, the power transistor 401 and temperature-sensing resistor RSNS may be fabricated on one die and the controller components, e.g., current bias Ibias, voltage dividers R1, R2, comparator 402, and transistor 403, may be formed on a separate due. A further benefit of the implementation shown in FIG. 4 is that process variation in the production of the temperature-sense resistor RSNS may be compensated by trimming the constant current draw Ibias.

Figure 5:
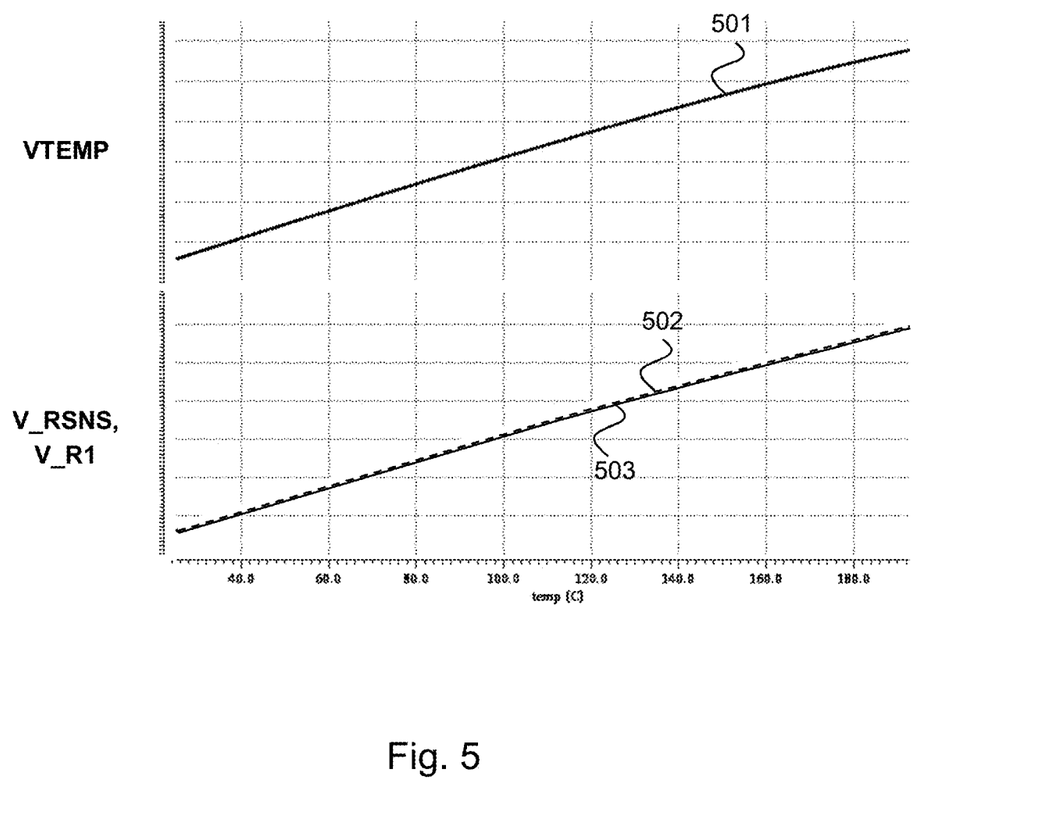
FIG. 5 is a couplet of graphs showing the response of the circuit in FIG. 4 to a change in temperature of a power transistor according to aspects of the present disclosure.

FIG. 5 is a couplet of graphs showing the response of the circuit in FIG. 4 to a change in temperature of the semiconductor transistor according to aspects of the present disclosure. As shown the output VTEMP 501 (solid line) rises linearly with temperature and duplicates the voltage across the temperature-sensing resistor V_RSNS 502 (dashed line) at a higher voltage. Note also that the voltage across the reference resistor V_R1 503 (solid line) also closely follows the voltage across the temperature-sensing resistor V_RSNS. The close correlation between the VTEMP 501 and temperature allows the curve to be used for triggering of one or more temperature related corrective actions.

Figure 6:
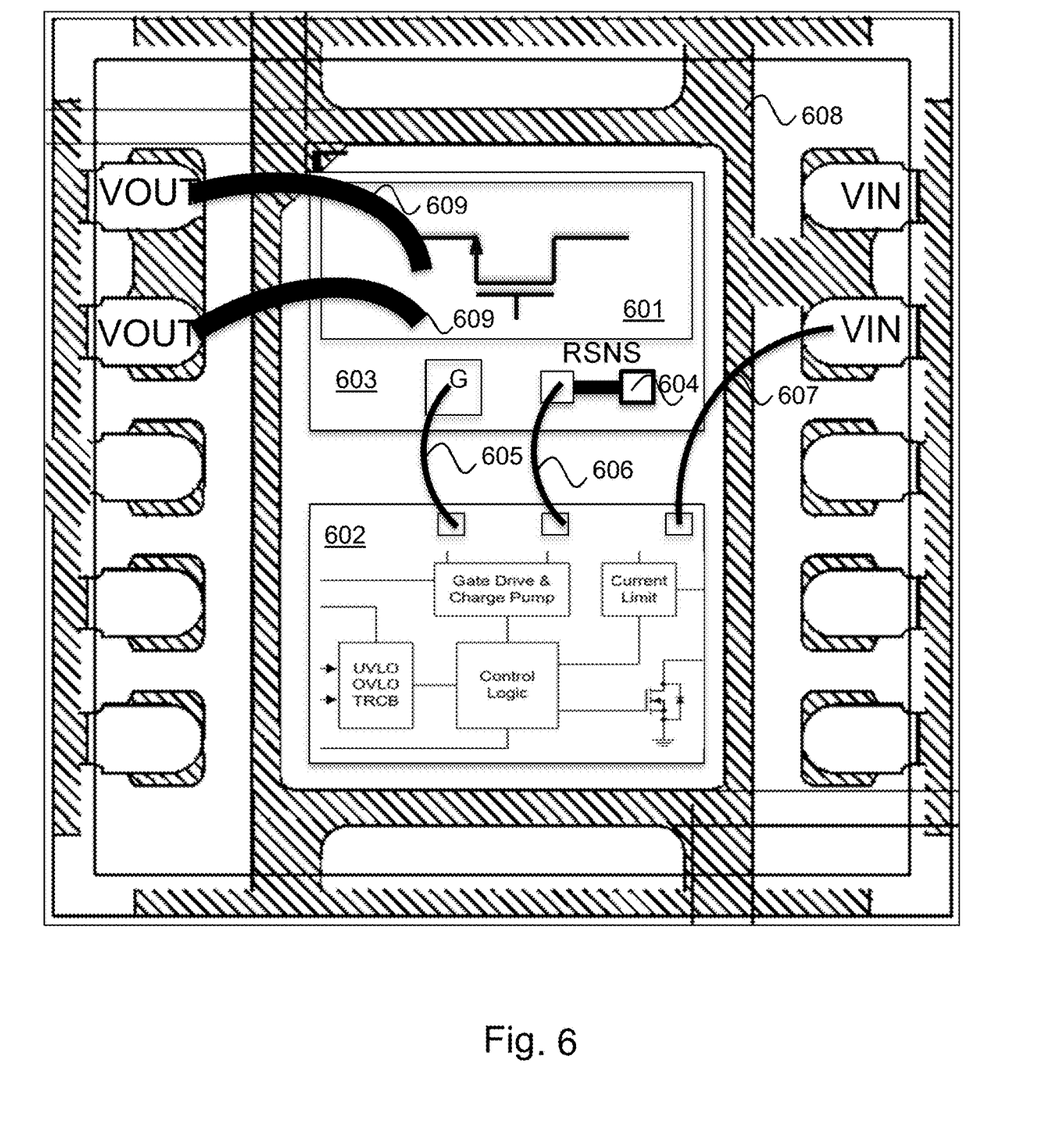
FIG. 6 is a detailed diagram showing an in-situ implementation of a power transistor temperature-sensing device according to aspects of the present disclosure.

FIG. 6 is a detailed diagram showing an in-situ implementation of the temperature-sensing device according to aspects of the present disclosure. As shown, a power transistor 601 and the temperature-sense resistor RSNS share the same die 603. In this implementation the controller 602 is on a separate die and bond wires 606 connect the temperature-sensing resistor RSNS to the controller 602. A separate bond wire 605 conductively couples a transistor gate output of the controller 602 to the gate of the transistor 601. One side of the temperature-sensing resistor RSNS is connected to the voltage input of the transistor either through a via 604 in the die of the transistor (as shown) or a bond wire (not shown here) to the voltage input connection VIN. A bond wire 607 may electrically connect a parallel coupling to the input of the transistor VIN. The voltage input to the transistor VIN may be connected through a conductive plane 608 of the device package. The voltage output of the transistor may be connected to voltage output pads VOUT by bond wires 609, as shown two bond wires connect the voltage output to the transistor to increase the load carrying capacity.

Figure 7:
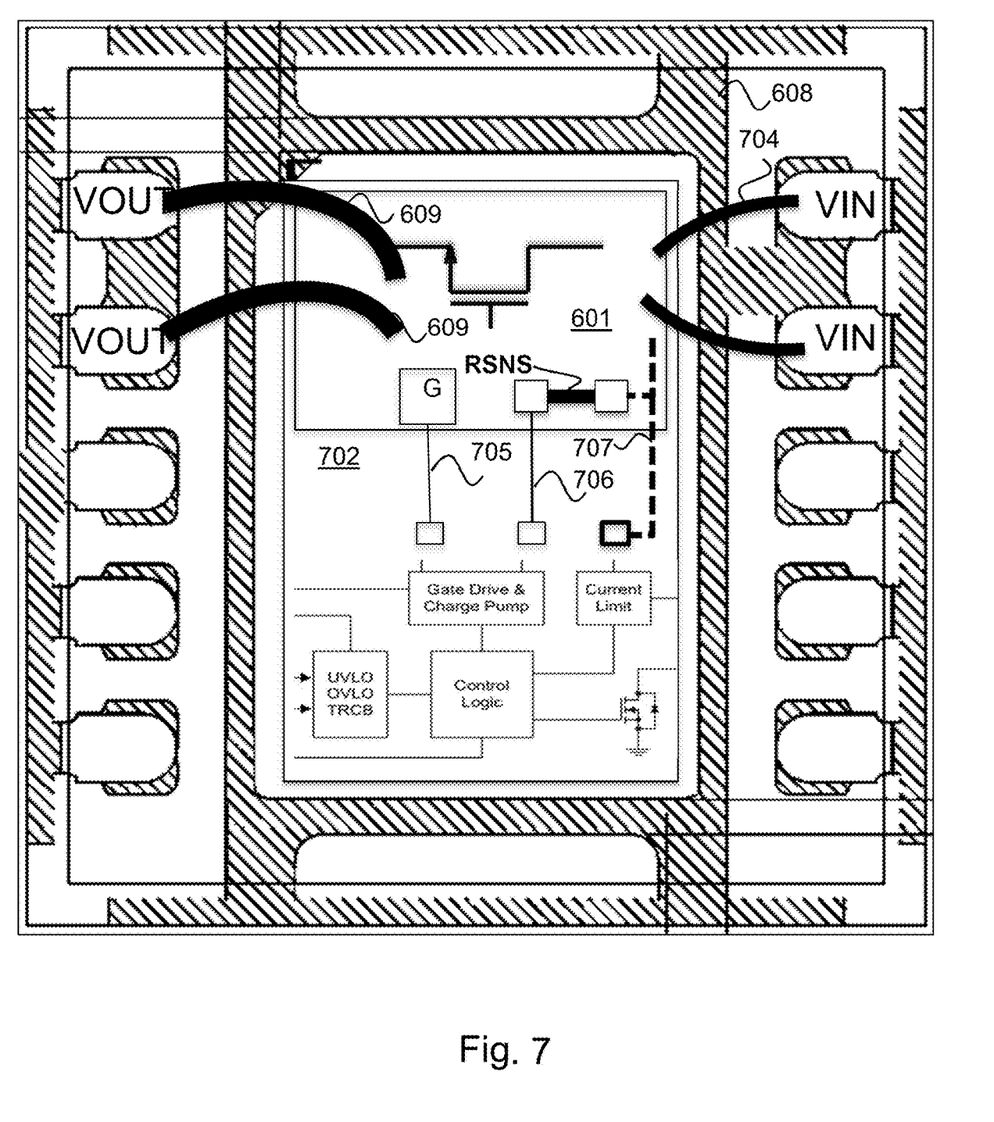
FIG. 7 is a detailed diagram showing an in-situ implementation of the temperature-sensing device on the same die as a power transistor according to aspects of the present disclosure.

FIG. 7 is a detailed diagram showing an in-situ implementation of the temperature-sensing device on the same die as a power transistor according to aspects of the present disclosure. In this single-die implementation, the controller and the transistor 601 share the same die 702. The input and output of the power FET 601 may be located on the topside of the die 702. In such an implementation, the voltage input (drain) of transistor 601 may be connected to VIN through bond wires 704. The input voltage VIN may be coupled to the temperature-sense resistor RSNS and the controller through metal traces 707 on the die 702, as depicted in FIG. 7 or, alternatively, by bond wires. Furthermore, in the implementation shown in FIG. 7, metal traces 705, 706 connect the temperature-sensing resistor RSNS and the gate G of the transistor 601 to the controller instead of bond wires. It should be noted that the connections between the parallel coupling to the voltage input to the transistor and the temperature-sensing resistor RSNS to the voltage input of the transistor may either be through a via, metal trance or a bond wire.

Aspects of the present disclosure allow for an accurate way to determine the temperature of the semiconductor transistor in high frequency switching applications and to take corrective action when high temperatures threaten operation of such a transistor. Temperature sensing uses the voltage across a resistor, which is substantially more linear with respect to temperature dependence than with a diode network. Aspects of the present disclosure include implementations that use fewer bond wires than existing solutions.

While the above is a complete description of the preferred embodiments of the present invention, it is possible to use various alternatives, modifications, and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for". Any element in a claim that does not explicitly state "means for" performing a specified function, is not to be interpreted as a "means" or "step" clause as specified in 35 USC § 112, ¶6.

What is claimed is:

1. A device for temperature monitoring of a power transistor formed in a first semiconductor die comprising;
    a temperature-sensing resistor disposed in the first semiconductor die, wherein a side of the temperature-sensing resistor is coupled to the power transistor on a voltage input side of the transistor;
    a controller coupled to a second side of the temperature-sensing resistor wherein the controller is configured to detect a voltage across the resistor and trigger a temperature related corrective action using the voltage across temperature-sensing resistor, wherein the temperature related corrective action regulates a current though the power transistor.

2. The device of claim 1 wherein the controller is configured to trigger the temperature related corrective action when the voltage across the temperature-sensing resistor meets a threshold.

3. The device of claim 1 wherein the controller is configured to trigger the temperature related corrective action based on a voltage from the temperature-sensing resistor wherein the controller is configured to correlate the voltage from the temperature resistor with a temperature of the transistor device.

4. The device of claim 1 wherein the controller is coupled to the transistor on a voltage input side of the transistor in addition to being coupled to the transistor through the temperature-sensing resistor.

5. The device of claim 1 wherein the controller is located on a second semiconductor die.

6. The device of claim 5 wherein a bond wire electrically connects the controller to the temperature-sensing resistor.

7. The device of claim 1 wherein the controller is located on the first semiconductor die.

8. The device of claim 1 wherein the controller is further configured to draw a constant current through the temperature-sensing resistor from the voltage input side of the power transistor and draw a separate current through a parallel coupling connected to the input side of the transistor wherein the parallel coupling is connected in parallel with the temperature-sensing resistor.

9. The device of claim 8 wherein the controller is further configure to compare the voltage across the temperature-sensing resistor to a reference voltage, when the voltage across the temperature-sensing resistor meets the reference voltage compare the voltage across the temperature-sensing resistor to a voltage across the parallel coupling whereby the comparison of the voltage across the temperature-sensing resistor to the output voltage of the parallel coupling triggers the temperature related corrective action.

10. The device of claim 8 wherein the controller is configured to amplify a voltage across the temperature-sensing resistor and compare the resulting amplified voltage across the resistor to a reference voltage.

11. The device of claim 1 wherein the temperature-sensing resistor is a diffused resistor formed in the semiconductor die or a polycrystalline resistor formed on the semiconductor die.

12. The device of claim 1 wherein the controller is further configured to trim the output voltage of the temperature-sensing resistor to compensate for variations in the input voltage or room temperature resistance of the temperature-sensing resistor.

13. A method for temperature control of a transistor formed in a first semiconductor die, comprising
    a) biasing a temperature-sensing resistor formed in the first semiconductor die by drawing input current from an input of the transistor;
    b) drawing a separate current through a parallel coupling connected to the input of the transistor, wherein the parallel coupling is connected in parallel with the temperature-sensing resistor;
    c) comparing an output voltage of the temperature-sensing resistor to an output voltage of the parallel coupling;
    d) using the result of the comparison to trigger a temperature related corrective action.

14. The method of claim 13 wherein the comparison of the output voltage of the temperature-sensing resistor to an output voltage of the parallel coupling, amplifies the output voltage of the temperature-sensing resistor to a threshold voltage.

15. The method of claim 14 wherein d) further includes comparing the amplified output voltage of the temperature-sensing resistor to a threshold voltage wherein the threshold voltage is related to a voltage through the temperature-sensing resistor at a breakdown temperature for the transistor.

16. The method of claim 13 wherein the result of the comparison of the output voltage of the temperature-sensing resistor to an output voltage of the parallel coupling is trigger for the temperature related corrective action.

\* \* \* \* \*